(No Model.) E. W. PERRY, Jr. 3 Sheets—Sheet 2.
PHOTOGRAPHIC CAMERA.

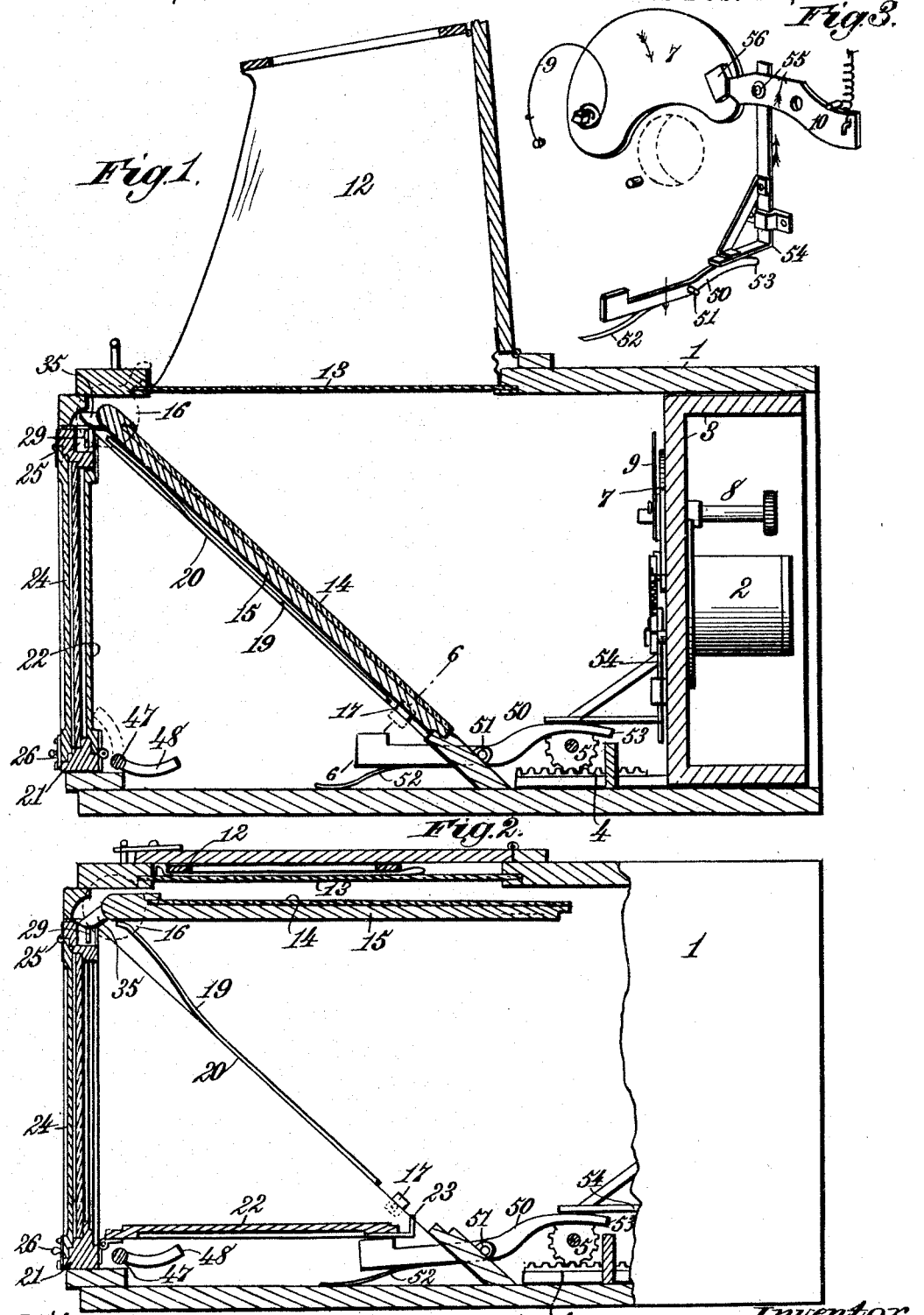

No. 492,696. Patented Feb. 28, 1893.

Witnesses.
Robert Everitt
J. A. Rutherford

Inventor.
Enoch Wood Perry Jr.
By James L. Norris
Atty.

(No Model.) 3 Sheets—Sheet 3.

E. W. PERRY, Jr.
PHOTOGRAPHIC CAMERA.

No. 492,696. Patented Feb. 28, 1893.

Witnesses.

Inventor:
Enoch Wood Perry Jr.

UNITED STATES PATENT OFFICE.

ENOCH WOOD PERRY, JR., OF NEW YORK, N. Y., ASSIGNOR OF ONE-HALF TO EMIL KIPPER, OF ADAMS, MASSACHUSETTS.

PHOTOGRAPHIC CAMERA.

SPECIFICATION forming part of Letters Patent No. 492,696, dated February 28, 1893.

Application filed July 7, 1892. Serial No. 439,278. (No model.)

*To all whom it may concern:*

Be it known that I, ENOCH WOOD PERRY, Jr., a citizen of the United States, residing at New York, in the county of New York and State of New York, have invented new and useful Improvements in Photographic Cameras, of which the following is a specification.

This invention relates to that type of photographic cameras wherein a plate holder is provided with a hinged door which is opened automatically to expose the plate by the act of inserting or sliding the plate holder into the camera box or case.

The objects of my invention are to improve the prior construction and to provide novel means whereby a movable mirror frame in the camera box or case operates to release the locking mechanism of a hinged door for exposing a plate or film.

To accomplish these objects my invention involves the features of construction and the combination or arrangement of devices hereinafter described and claimed, reference being made to the accompanying drawings, in which—

Figure 4:
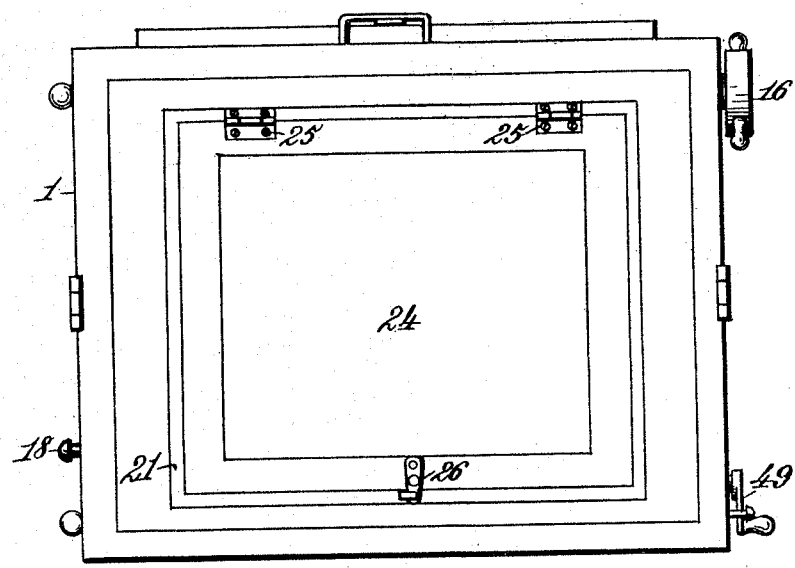
Figure 5:
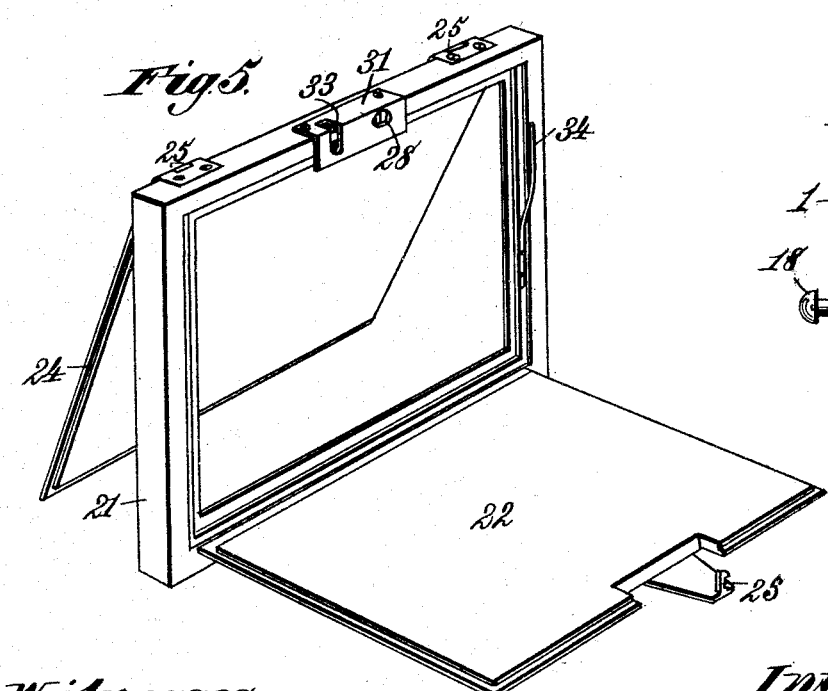
Figure 6:
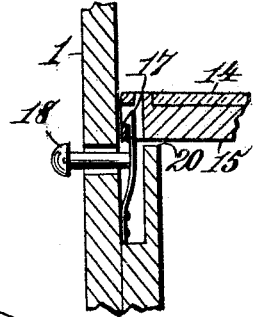
Figure 7:
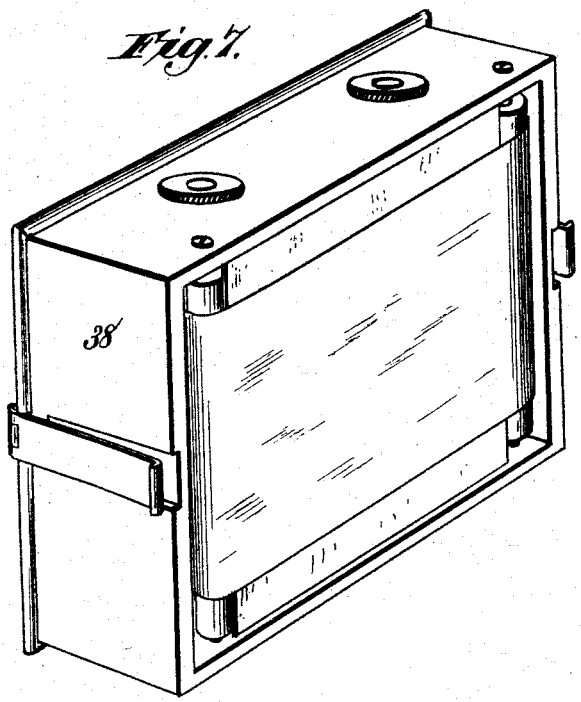
Figure 8:
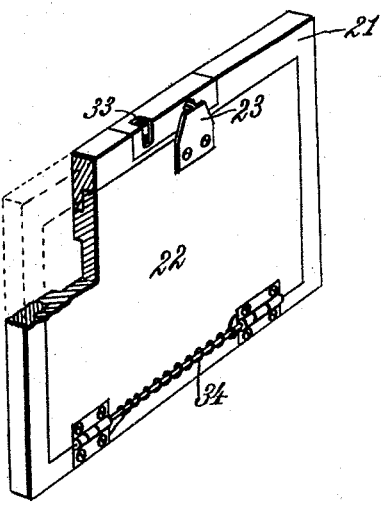
Figure 9:
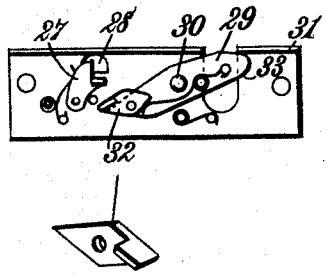

Figure 1, is a vertical central sectional view of a camera box or case embodying my invention, the adjustable mirror which throws the image on the ground glass being in its inclined position. Fig. 2, is a similar view showing the mirror elevated to a horizontal position. Fig. 3, is a detail perspective view of a portion of the shutter mechanism. Fig. 4, is a rear end elevation of the camera box showing a plate holder in position. Fig. 5, is a detail perspective view of a plate-holder. Fig. 6, is a detail sectional view taken on the line 6—6 Fig. 1, to more clearly illustrate the catch which retains the mirror in its inclined position. Fig. 7, is a detail perspective view of an ordinary roll-holder for a continuous film. Fig. 8, is a broken detail perspective view of a hinged door and frame adapted for use in connection with the roll-holder, and Fig. 9, is a detail perspective view of the locking mechanism for the hinged door.

In order to enable those skilled in the art to make and use my invention I will now describe the same in detail, referring to the drawings wherein The numeral 1 indicates a camera box or case of any construction suitable for the conditions required and of such size and configuration as to render it portable. This box or case is provided with an exposing lens-tube 2, which as here exhibited, is carried by a partition 3, adjustable through the medium of a rack 4, and a pinion 5, for the purpose of focusing. The partition carries a shutter which may be of any type desired, but as here shown is composed of a swinging plate 7, Fig. 3, mounted on a shaft 8 and subject to the action of a spring 9, the shaft serving to set the shutter, and the spring to automatically swing the shutter past the exposure opening in the partition 3, when such shutter is released from the detaining dog or pawl 10.

The top wall of the camera box or case is provided with the usual hood 12, and horizontal ground glass 13, and within the box or case is arranged a mirror 14, which is mounted on a swinging frame 15, having its upper end suitably pivoted so that the mirror can be turned to an inclined position as in Fig. 1, or elevated to a horizontal position as in Fig. 2. The pivoted end of the mirror frame is connected with a finger-piece or hand wheel 16, indicated by dotted lines in Figs. 1 and 2 and illustrated in Fig. 4, such hand wheel serving as a medium by which the mirror frame can be swung in the arc of a circle. The mirror frame is adapted to be locked in its inclined position through the medium of a spring catch 17, adapted to be released from the mirror frame by a suitable push button 18, which projects to the exterior of the camera box or case. The mirror frame is automatically elevated to the horizontal position illustrated in Fig. 2, through the medium of a suitable spring 19, one or more, which, as here shown, is supported by a shouldered portion 20, of the camera box or case. I do not however, confine myself to any particular location or construction of spring, it only being essential or desirable that the mirror frame be automatically elevated when the spring catch 17 is released from engagement therewith.

The rear end of the camera box or case is constructed to receive a frame 21, containing a hinged door 22, having a catch 23, Fig. 5, adapted to be engaged by a locking mechanism mounted on the door frame 21. The hinged door is exposed to the action of a suitable spring so that when the catch 23 is released from the locking mechanism on the door frame, the door will be automatically swung open in a downward direction to the position represented by Fig. 5.

The frame 21 may constitute a holder for a plate or film and this construction is represented by Figs. 1, 2, 3, 4, and 5, in which event the rear portion of the door frame is provided with a hinged cover 24, hinged as at 25 and having a catch 26 so that the plate or film can be introduced into the frame. The hinged cover is not, however, essential, as obviously the plate or film can be otherwise introduced into the frame 21, to occupy a position in rear of the hinged door 22.

In practice the frame 21 is so arranged that the door 22 when closed and locked stands vertically, or in a plane at right angles to the lens tube, or approximately so.

The locking mechanism on the door-frame may be of any desired construction, but that illustrated by Fig. 9 is preferred and is composed of a pivoted dog 27 adapted to engage the catch 23 when the latter enters the orifice 28. The dog 27 is released from the catch through the medium of a swinging lever 29, mounted on a pivot 30 carried by the lock case 31, and having a pivoted section 32, for a purpose hereinafter explained in such manner that when the tail end 33 of the lever 29 is depressed, the dog 27 is moved out of engagement with the catch 23, and the hinged door 22 is instantly thrown open in a downward direction to the position represented by Fig. 5, for the purpose of exposing the plate or film.

The spring for throwing the door 22 to its open position may be constructed and arranged in any desired manner, but as represented in Fig. 5, the spring is composed of an elastic wire or spring arm 34, secured to the door-frame and having its upper free extremity adapted to bear against the door 22, when the latter is closed.

It is desirable to render the hinged door susceptible of being opened at the will of the operator from the exterior of the camera box or case, and to this end I provide means whereby the catch 23 can be released from the locking mechanism on the door frame by a device actuated by the operator outside the camera box or case. This object is accomplished by providing the upper pivoted end of the mirror frame 15 with an arm or projection 35, which operates on the tail end 33, of the lever 29, when the mirror frame rises to the position represented in Fig. 2. It will be obvious that the mirror frame cannot rise until the locking catch 17 is released from engagement therewith by operating the push button or finger-piece 18, Fig. 6 and consequently the operator can at any time effect the opening of the hinged door to expose the plate or film, in which respect my invention possesses many obvious advantages over that construction wherein the hinged door is automatically opened the instant the plate-holder is inserted or slid into a camera box or case.

In the construction shown and described, where the catch 23 is released by the action of the arm or projection 35 on the pivoted end of the mirror frame 15, it is advisable to employ the pivoted section 32, Fig. 9, as a part of the locking mechanism for the spring-opened door 22, because this door must be closed and locked before the arm or projection 35 of the mirror frame is raised from the lever 29, and without the section 32 the lock would remain open as long as the mirror frame stands horizontal. If the mirror frame is moved to its inclined position and the lever 29 is released prior to closing the door 22, it would be impossible to raise the door upward as there would be insufficient space for this purpose, but according to my invention after the exposure has been made the first operation is to close and fasten the door 22, which must be done before the mirror frame 15 is returned to its original inclined position. As the position of the parts would prevent the dog 27 from engaging with the catch 23 on the closing of the door, the pivoted section 32 is provided and it renders the dog 27 susceptible of engaging at any time with the catch 23 without regard to the position of the lever 29.

In the modification Figs. 7 and 8 I have illustrated a door-frame 21 and hinged door 22, adapted to stand in front of an ordinary roll-holder 38, adapted to contain a continuous film. In this construction the door-frame is not intended to hold a plate or film but is merely provided with the hinged door 22, which is exposed to the action of a spring 34, so that when the catch 23 is released from the locking mechanism on the door frame, by the action of the arm or projection 35 on the mirror frame, as hereinbefore explained, the hinged door will be thrown open in a downward direction for the purpose of exposing the film in the roll-holder. The catch 23 and the locking mechanism are substantially the same as hereinbefore described, and therefore require no further explanation.

In practical operation, after the exposure has been made, it is important to close the door 22, prior to removing the door-frame from the camera box or case, and to accomplish this, I provide a rock shaft 47 located in juxtaposition to the lower edge of the door frame 21, and provided with an arm 48, so that when the shaft is turned through the medium of a handle 49, located outside the camera box or case, the hinged door will be thrown upward into its closed position and automatically locked by its catch engaging the locking mechanism on the door-frame.

The door-frame is so constructed as to tightly fit the rear end of the camera box or case for the purpose of effectually excluding light from the interior thereof, and since the hinged door can be closed from the exterior of the camera box or case prior to the removal of the door frame 21, there is no danger of light gaining access to the plate or film.

In connection with a spring impelled, hinged door, located in front of a plate or film as described and shown, I have organized means whereby the shutter is automatically released to expose the plate or film when the hinged door is thrown to its open position. A novel, simple and efficient mechanism for accomplishing this object is composed of a lever 50, Figs. 1, 2 and 3, pivoted intermediate its ends as at 51, and acted on at its rear end by a spring 52, for the purpose of depressing its front end 53. The front end of the rocking lever 50, is arranged in juxtaposition to a vertical slide 54, pivotally connected at its upper end as at 55, to the detaining dog or pawl 10, of the shutter 7, and the rear end of the rocking lever is arranged in such position that when the hinged door 22 approaches a horizontal position it depresses such rear end of the lever and thereby elevates the front end 53 so that the slide 54 is raised and the detaining pawl or dog 10 is released from engagement with the stop 56 on the shutter 7, whereupon the latter will automatically swing and close the exposure orifice to effect an instantaneous exposure of the plate or film.

While I have described a particular construction of camera box or case and shutter I do not wish to be understood as confining myself thereto, as various other modifications can be adopted without altering the character of my invention.

The plate-holding door frame, or the roll-holder, may be secured in position in or at the rear end of the camera-box or case by any suitable contrivances which will fulfill all the conditions required.

Having thus described my invention, what I claim is—

1. The combination with a photographic camera box, of a hinged door arranged at the rear end of the box approximately at right angles to the axis of the lens tube and adapted to swing downward to its open position for exposing a plate or film, a locking mechanism for holding the door closed while it stands approximately at right angles to the lens tube for shielding the plate or film from exposure, a spring acting to throw the door downward to its open position when the door locking mechanism is unlocked, a swinging mirror frame pivoted in the box, movable independent of any movement of the camera shutter, and having devices to operate upon and unlock the door locking mechanism when said mirror frame is swung in one direction, and means operated from the exterior of the box for swinging the mirror frame, substantially as described.

2. The combination with a photographic camera box or case, of a hinged door arranged at the rear end portion of the camera box or case and adapted to swing open to expose a plate or film, a locking mechanism for holding the door closed to shield the plate or film from exposure, and a swinging mirror frame pivoted in the box or case and having an arm or projection at its pivoted end portion which operates to unlock the locking mechanism when said mirror frame is swung in one direction, substantially as described.

3. The combination with a photographic camera box or case, of a hinged door arranged at the rear end portion of the camera box or case and adapted to swing open to expose a plate or film, a locking mechanism for holding the door closed to shield the plate or film from exposure, a swinging mirror frame pivoted in the box or case and having an arm or projection which operates to unlock the locking mechanism when said mirror frame is swung in one direction, and a finger piece at the exterior of the camera box or case for swinging the mirror frame, substantially as described.

4. The combination with a photographic camera box or case, of a hinged door arranged at the rear end portion of the camera box or case and adapted to swing open to expose a plate or film, a locking mechanism for holding the door closed to shield the plate or film from exposure, a swinging mirror frame pivoted in the box or case and having an arm or projection at its pivoted end portion which operates to unlock the locking mechanism when said mirror frame is swung in one direction, a spring acting on the door to throw it to its open position when the locking mechanism is unlocked by the arm or projection of the mirror frame, and a finger piece located at the exterior of the box or case for swinging the mirror frame, substantially as described.

5. The combination with a photographic camera box or case, of a hinged door arranged at the rear end portion of the camera box or case and adapted to swing open to expose a plate or film, a locking mechanism for holding the door closed to shield the plate or film from exposure, a swinging mirror frame pivoted in the box or case and having devices which operate to unlock the door when said mirror frame is swung in one direction, a spring for throwing the door open when the locking mechanism is unlocked, means operated at the exterior of the box or case for swinging the mirror frame, a shutter, and a shutter detaining mechanism operated by the hinged door when the latter is thrown open by the power of its spring, substantially as described.

6. The combination with a photographic camera box, of a hinged door arranged at the rear end of the box approximately at right angles to the axis of the lens tube and adapted to swing downward to its open position to expose a plate or film, a locking mechanism for holding the door closed while it stands approximately at right angles to the lens tube to shield the plate or film from exposure, a spring acting to throw the door open when the locking mechanism is unlocked, a swinging mirror frame pivoted in the box and having an arm or projection at its pivoted end portion which operates to unlock the door-locking mechanism when the said mirror frame is swung in one direction, and an independent door closing device composed of a rock shaft located in the box and having an arm which acts to raise and close the door against the tension of its spring after an exposure has been made, substantially as described.

7. The combination with a photographic camera box or case, of a hinged door arranged at the rear end of the box or case approximately at right angles to the axis of the lens tube and adapted to swing open to expose a plate or film, a locking mechanism for holding the door when closed, a movable mirror frame having an arm or projection which operates to unlock the locking mechanism when said mirror frame is moved in one direction, a spring acting on the door to throw it to its open position when the locking mechanism is unlocked by the action of the mirror frame, and an independent door closing device operated from the exterior of the camera box and engaging the door to close the latter against the tension of its spring after an exposure has been made, substantially as described.

In testimony whereof I have hereunto set my hand and affixed my seal in presence of two subscribing witnesses.

ENOCH WOOD PERRY, Jr. [L. S]

Witnesses:
ABRAHAM WEBB,
ANTHONY BURDORF.